United States Patent [19]
Wandel

[11] Patent Number: 6,034,623
[45] Date of Patent: Mar. 7, 2000

[54] AUTONOMOUS RADIO TELEMETRY

[75] Inventor: Matthias Wandel, Waterloo, Canada

[73] Assignee: Research In Motion Limited, Waterloo, Canada

[21] Appl. No.: 08/897,346

[22] Filed: Jul. 21, 1997

[51] Int. Cl.[7] .................................................. G08C 19/16

[52] U.S. Cl. .............................. 340/870.01; 340/870.02; 340/870.07; 379/106.01; 379/106.03

[58] Field of Search .................. 340/870.01, 870.02, 340/870.07, 310.01; 379/106.01, 106.03

[56] References Cited

U.S. PATENT DOCUMENTS

| | | | |
|---|---|---|---|
| 4,940,976 | 7/1990 | Gastouniotis et al. | 340/870.02 |
| 5,249,218 | 9/1993 | Sainton | 379/98 |
| 5,572,438 | 11/1996 | Ehlers et al. | 364/492 |

*Primary Examiner*—Michael Horabik
*Assistant Examiner*—Timothy Edwards, Jr.
*Attorney, Agent, or Firm*—Jones, Day, Reavis & Pogue; Charles B. Meyer, Esq.

[57] ABSTRACT

An improved radio modem is disclosed for use with an autonomous radio telemetry system. The radio modem includes a reprogrammable microprocessor, a radio transceiver, and a serial interface. By providing a software program within the radio modem that converts the serial interface into a general purpose interface to external input/output devices, and by providing additional programmed decision making capability into the radio modem, no external telemetry computer is required to interface with the input/output devices, and the radio modem operates as a combination telemetry computer and radio device. The radio modem also includes a novel reprogrammable state machine architecture for communicating with the input/output devices, and for deciding what actions to take based on the status of the external devices.

4 Claims, 6 Drawing Sheets

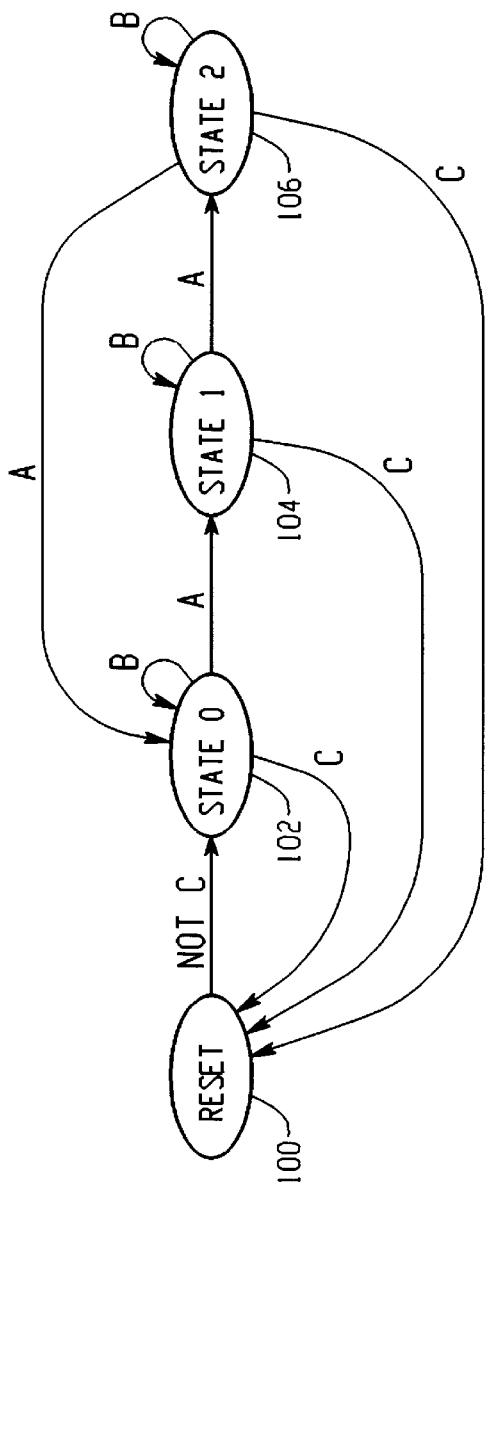

| ARROW | CONDITION |
|---|---|
| A | THE STATE'S PROPOGATION CONDITION HAS BEEN MET, AS WELL AS THE SPECIFIED NUMBER OF REPETITIONS. THE NEXT STATE IS ENTERED, AND THE NEXT STATE PROPOGATION CONDITION IS IMMEDIATELY CHECKED. |
| B | THE STATE'S PROPOGATION CONDITION HAS BEEN MET, BUT THE REQUIRED REPETITION COUNT HAS NOT BEEN MET. THE STATE MACHINE REMAINS IN THE SAME STATE FOR THIS ITERATION, BUT THE REPETITION COUNTER IS INCREMENTED. |
| C | THE MACHINE'S RESET CONDITION HAS BEEN MET. THE STATE MACHINE ENTERS AND REMAINS IN ITS RESET STATE UNTIL THE RESET CONDITION IS NO LONGER MET. |

*Fig. 6*

AUTONOMOUS RADIO TELEMETRY

BACKGROUND OF THE INVENTION

The present invention is directed toward the field of radio telemetry. In particular, an improved radio modem is disclosed for use in an autonomous radio telemetry system, the radio modem including a programmed mode of operation that converts the general purpose radio modem into a special purpose radio telemetry computer system, thereby eliminating the need for a separate telemetry computer as taught by the prior art.

In a telemetry system analog or digital metering data, such as an analog measurement of a process variable, or the digital state of a switch, is captured at a remote location by a telemetry computer and is then transmitted to a central computer facility via a telecommunication device. In radio telemetry the telecommunication device is a radio modem that transmits the metering data between the telemetry computer and the central computer facility via radio frequency waves, thus eliminating the need for land-line wiring, such as a telephone line.

Applications for telemetry systems range from simple switch actuation and monitoring systems to complex process line computers. For example, the following systems could be implemented with an autonomous telemetry system: (i) monitoring a door switch and sending a signal when the door is opened; (ii) counting the number of items put into a drop box, by noting the number of times the drop box door is opened, and periodically reporting the number of items in the box; (iii) acquiring and recording the temperature and current draw of a motor and transmitting recently recorded data when the temperature of the motor exceeds a predetermined level; or (iv) remotely turning on/off lights, or an alarm system; etc. The applications of such telemetry systems are numerous, and the previous examples are merely presented to assist in understanding the broad scope of the possible applications for such telemetry systems.

Prior art radio telemetry systems include a separate telemetry computer and radio modem at a remote location for capturing and transmitting data to the central computer facility. Implementors of these types of systems incorporate an embedded programmed microprocessor as the telemetry computer, and interface the telemetry computer to input/output devices such as a complex analog to digital converter board, or a simple switch. The telemetry computer is also connected to the radio modem, generally via a serial interface. The telemetry computer controls and monitors the interface to the input/output devices and communicates with the central computer system using the radio modem. In these types of prior art telemetry systems, the radio modem is simply a module in the overall remote telemetry sub-system that is required for communication purposes.

These previous telemetry systems suffer from a number of disadvantages, particularly when the telemetry system is used in a relatively simple application, such as the monitoring of a switch, or the acquisition of a single process variable. The disadvantages of these prior art systems include high cost, high power consumption, large physical size, and complex integration.

These disadvantages arise because the previous telemetry systems do not appreciate or utilize the power of the microprocessor or microcontroller that is built into present day radio modems. Instead, these systems use the radio device solely for communication, and employ a separate embedded microprocessor, the telemetry computer, as the interface to the input/output devices. These systems waste the processing power available in the radio modem and therefore result in increased cost, power, and size of the telemetry device.

Therefore, there remains a need for a simple, low cost, small, and easy to integrate telemetry device for use in an autonomous radio telemetry system. There remains a further need for such a telemetry device that does not waste the processing power inherent in the radio modem, but instead is configured to maximize the processing power of the microprocessor contained in the radio.

In addition, there remains a need for an autonomous telemetry system that includes at least one of the above mentioned telemetry devices in communication with a central computer system that is capable of sending commands to the telemetry devices, and receiving data transmissions from the telemetry devices indicating the state of input/output devices at the remote location.

SUMMARY OF THE INVENTION

The present invention overcomes the problems noted above and satisfies the needs in this field for a low cost, low power, simple, easy to integrate telemetry device for use in a wireless telemetry system. According to the present invention, a telemetry device is provided that includes a radio modem having a programmable microprocessor, wherein the radio has been configured to operate in a mode which converts the general purpose radio device into a special purpose radio telemetry computer. By recognizing that much of the processing power of the radio modem is wasted in prior art telemetry systems, and by programming the radio modem such that it takes the place of the prior art telemetry computer, the present invention provides a solution to the problems associated with the prior art systems.

The present invention provides a telemetry device that includes a radio modem having an internal microprocessor, reprogrammable telemetry program storage, a radio transceiver, and a serial interface. In the present invention, the serial interface, which is normally used to communicate with another computer system, is reconfigured by the microprocessor operating the telemetry program to be a general input/output interface for connecting input/output devices (e.g. switches, TTL logic, $I^2C$ bus devices) directly to the radio modem. By connecting the input/output devices directly to the modem, the present invention provides a telemetry device which does not require a separate telemetry computer. The internal radio modem microprocessor takes the place of the telemetry computer, performing data acquisition, I/O control, as well as its prior function of controlling data transmission over the radio modem transceiver. Thus, the present invention provides a new telemetry device which is smaller, lower cost, consumes less power, and is easier to integrate than the previous telemetry devices.

In addition to reconfiguring the serial port to interface with the input/output devices, the present invention includes the provision of a novel reprogrammable state machine architecture within the radio modem that provides flexible operation and programmability of the device. This state machine architecture, including a number of separately programmable state machines, is constructed in software, but could, be incorporated preferably in hardware.

The programmable state machines are used as decision making apparatuses for the telemetry device. These state machines can be reprogrammed or debugged remotely from the central computer system since the radio modem includes a reprogrammable memory. Thus, the operation of the remote telemetry device can be altered or tested without having to remove the device from a remote location or without having to send a technician to the remote site. This aspect of the invention is particularly advantageous where the telemetry device is located in a hazardous area.

There are many advantages of the present invention. First, by recognizing and utilizing the inherent processing power of the radio device, the present invention provides a simple, low power telemetry device that can be easily integrated with existing systems, and existing input/output devices. Another advantage of the present invention is that by eliminating the need for a separate telemetry computer, the total cost of the system is reduced since there are fewer components, smaller development costs, and less time required to configure and program the system.

Another advantage of the present invention is that it provides for a number of software state machines programmed into the radio modem, the state machines being easily and flexibly reprogrammed in order to meet a variety of needs for radio telemetry. These state machines provide an efficient, yet simple, decision-making architecture for the radio modem.

Yet another advantage of the present invention is that the radio modem telemetry program is reconfigurable from a remote location over the radio interface. This provides for remote alteration, testing, and debugging of the state machines without having to either remove the telemetry device or send a technician to the remote location. In addition, password protection is provided so that only authorized personnel can change the operation of the telemetry device.

As will be appreciated, the invention is capable of other and different embodiments, and its several details are capable of modifications in various respect, all without departing from the invention. Accordingly, the drawings and description of the preferred embodiment are to be regarded as illustrative in nature and not restrictive.

BRIEF DESCRIPTION OF THE DRAWINGS

The above advantages will become apparent from the following description when read in conjunction with the accompanying drawings wherein:

FIG. 6 is an example state diagram setting forth the propagation conditions for one of the state machines of the present invention;

DETAILED DESCRIPTION OF THE PREFERRED EMBODIMENT

Figure 1:
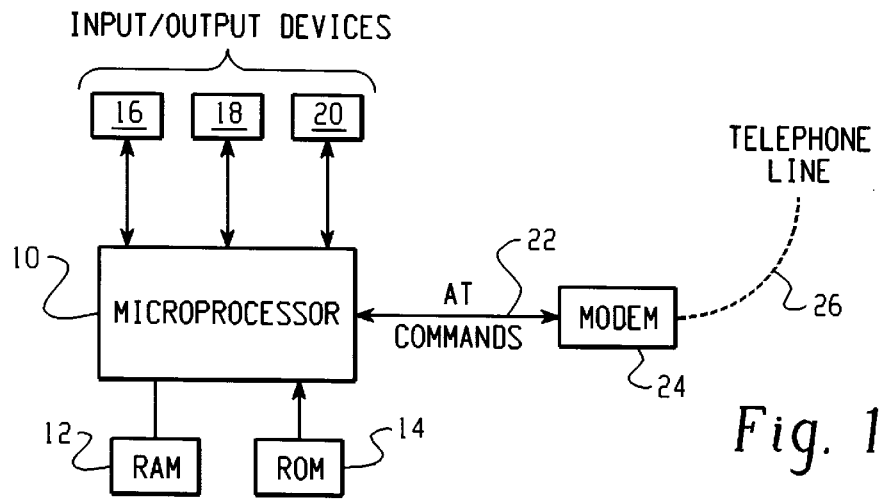
FIG. 1 is a block diagram of a prior art telemetry system using a telephone modem.
Figure 2:
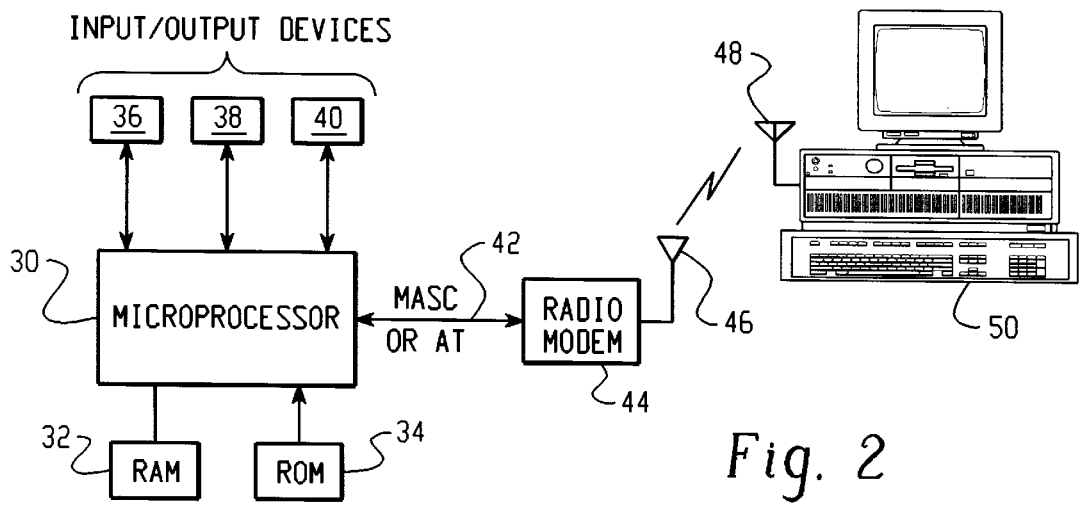
FIG. 2 is a block diagram of a prior art radio telemetry system.

Referring now to the drawings, FIG. 1 and 2 set forth prior art telemetry systems. FIG. 1 shows the traditional configuration of a prior art telemetry device, including separate modem 24 and telemetry computer 10, the telemetry computer 10 including RAM 12 and ROM 14, the RAM 12 being used for program operation and general purpose memory, and the ROM 14 being used for program storage. Input/Output devices 16, 18, and 20 are connected to the telemetry computer 10, which controls and manipulates the I/O devices, and transmits information via modem 24 over a standard phone connection 26 to a central computer system (not shown). The connection between the telemetry computer 10 and modem 24 is typically a serial port connection, such as a standard RS-232 connection, and the protocol used is generally the AT-modem protocol that is standard with most general purpose telephone modems.

FIG. 2 sets forth a prior art radio telemetry system, including the same elements as FIG. 1, including separate telemetry computer 30 and telecommunications device (radio modem) 44, RAM 32 and ROM 34 for use by the telemetry computer, several input/output devices 36, 38, and 40, and a central computer system 50 for communication and control of the telemetry device. However, FIG. 2 is a radio telemetry system, not a land-line system, so the telephone connection from FIG. 1 is replaced with a radio connection using a radio modem 44 (including an antenna 46). Central computer system 50 also includes a radio modem (not shown) with an antenna 48 for receiving and transmitting information to associated radio telemetry devices associated with the central computer system.

The present invention is applicable to any kind of radio modem and any type of radio frequency data network, however for the purpose of setting forth a preferred embodiment of the invention, the remaining drawings and detailed description will refer to a specific radio network, the Mobitex network, and a particular radio modem, the RIM 900 Mobitex radio modem, manufactured by Research In Motion, 295 Phillip Street, Waterloo, Ontario, Canada.

There are many types of radio networks currently in widespread use, such as Ardis, Mobitex, GSM, SMR, PCS, analog cellular, CDPD, etc, and each of these networks has associated types of radio modems that are used to transmit and receive data over the network. For example, for the Mobitex network, Ericsson, Motorola and Research In Motion manufacture radio modems. Any of these devices could be used in conjunction with the present invention.

The Mobitex network is a packetized RF data network that was developed by Eritel/Ericsson in 1984 in Sweden, and has become an international data communication standard. The Mobitex network was first established in North America in 1989 and is now available in most major metropolitan areas throughout Canada and the United States. The Mobitex packet-switched network provides highly reliable two-way digital data transmission, including error detection and correction to ensure the integrity of the data being sent and received.

In contrast to analog circuit switched systems, a packet-switched network, such as Mobitex, breaks the data into pieces called "packets". In Mobitex each individual packet is called an MPAK. Each MPAK includes 512 bytes of information, a time stamp, and the network address of the sender and receiver of the packet. In this way, each Mobitex packet can be successfully routed or returned to the correct network user.

The Mobitex network conforms to the International Organization for Standardization (ISO) model for data communications, termed the Open Systems Interconnection (OSI) model. The OSI model is an open architecture that divides data communication into several layers, each of which builds upon and masks the complexity of the layers below it. The seven layers of the OSI model are, from lowest to highest: physical layer, data-link-layer, network layer, transport layer, session layer, presentation layer, and application layer. The three layers actually involved in moving data from one computer to another are the data-link layer, the network layer, and the transport layer.

In Mobitex, the data-link layer includes the MASC and ROSI protocols. The MASC protocol (Mobitex Asynchronous Protocol) provides the machine interface that allows packets to be transferred over the data link created by Mobitex. The ROSI protocol (Radio Open System Interface) is used by the radio unit to communicate with the base station. The network layer in Mobitex is the MPAK described above, and the transport layer uses MTP/1 (Mobitex Transport Protocol 1), which is a tested and standardized transport protocol that ensures data packets are transmitted over Mobitex in order, and without loss of data integrity.

Referring back to FIG. 2, the prior art radio telemetry system is shown, including separate radio modem 44 and telemetry computer 30. Radio Modem 44 could be, for example, a RIM 900 MASC radio modem, or could be an Ericsson Mobidem-AT. Depending on the type of modem, serial interface 42 will be transferring either AT-type commands (Mobidem-AT) or MASC commands (RIM 900). In both cases, as is the case for the prior art system of FIG. 1, the telecommunications device, modem or radio modem, is only performing data communications functions. All interfacing and control of the input/output devices 36–40 is carried out by the telemetry computer 30 operating the program stored in ROM 34. This is the primary disadvantage of such prior art telemetry systems.

Figure 3:
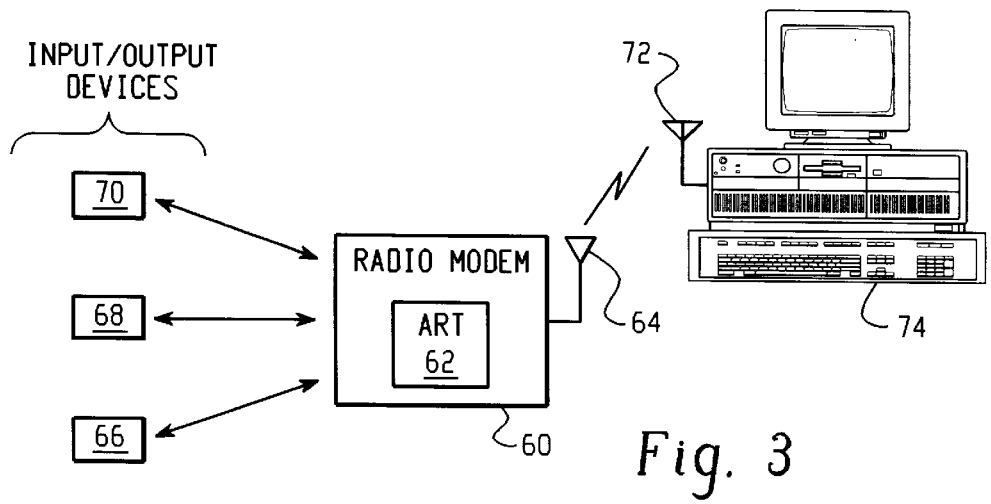
FIG. 3 is a block diagram of an autonomous radio telemetry system according to the present invention.

FIG. 3 sets forth a basic block diagram of an autonomous radio telemetry system according to the present invention. By recognizing that modern radio modems, such as the RIM 900, include powerful microprocessors or microcontrollers that are mostly idle during periods of time where no data transmission is occurring, the present invention solves the problems of the prior art telemetry systems by providing a low cost, low power, and easy to integrate telemetry device.

In FIG. 3, radio modem 60 includes antenna 64 and a stored autonomous radio telemetry (ART) program that converts the otherwise general purpose radio modem into a special purpose radio telemetry device. By providing the radio modem 60 with special computer programming (ART), the telemetry computer 30 of the prior art systems can be discarded and the input/output devices 66, 68, 70 can be interfaced directly to the radio modem 60. As will be described in more detail below, the ART program reconfigures the serial port of the radio modem from a standard Mobitex MASC protocol to a general purpose input/output system that supports TTL logic, simple switches, and an $I^2C$ bus. The ART program also includes a novel reprogrammable state machine architecture that is used for decision making by the telemetry device. In this manner, the radio modem becomes a more powerful special purpose telemetry device that includes most of the functionality and flexibility of the prior art system of FIG. 2 at a fraction of the cost, power, size and complexity.

Figure 4:
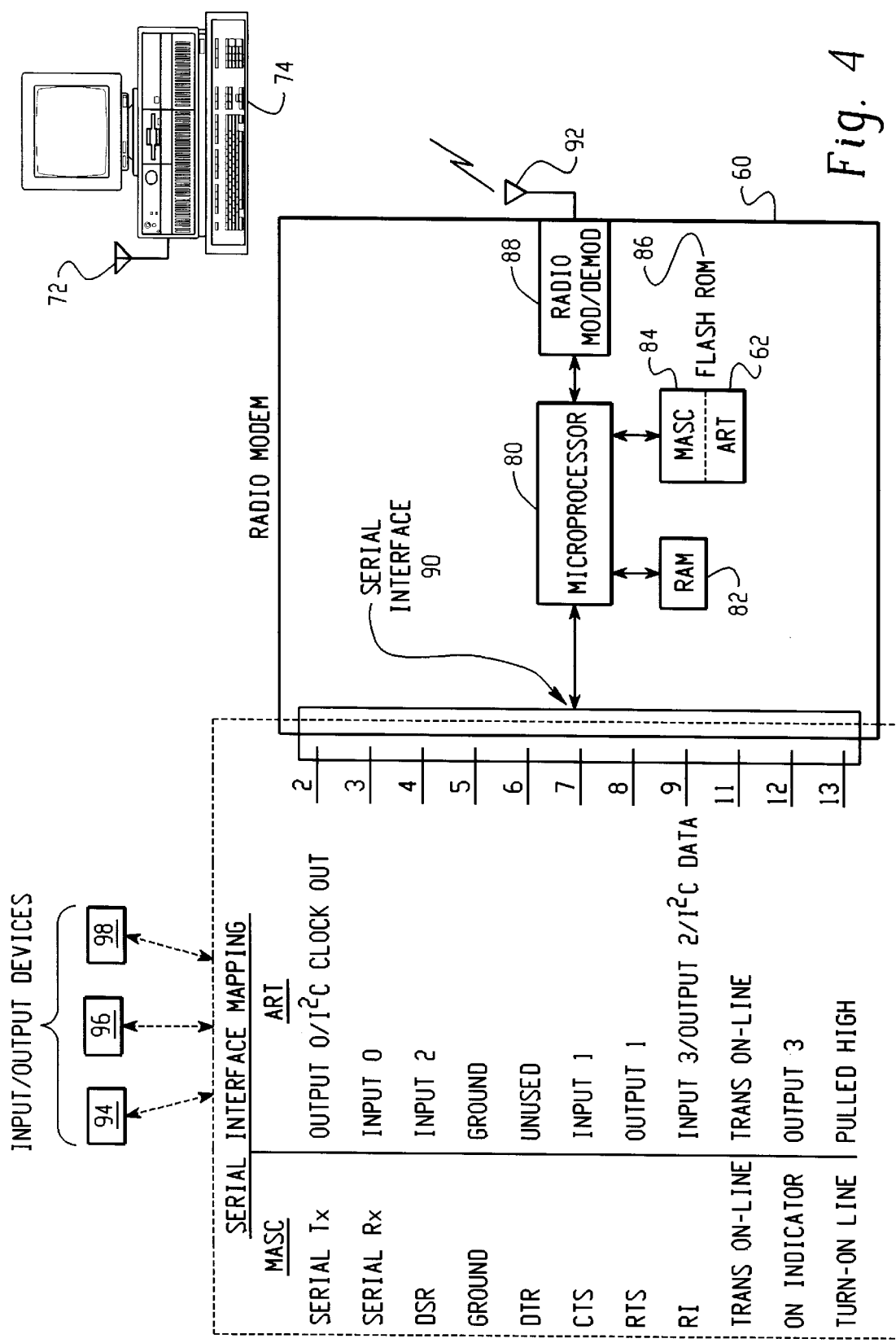
FIG. 4 is an expanded block diagram of the autonomous radio telemetry system according to the present invention showing the basic elements of the radio modem and the remapping of the serial port taught by the present invention.

FIG. 4 sets forth a more detailed block diagram of an autonomous radio telemetry system using the ART radio modem of the present invention. Radio modem 60 includes antenna 92, radio interface 88 including modulation and demodulation circuitry, microprocessor 80, serial interface 90, RAM 82, and Flash EPROM 86. The radio modem receives Mobitex data in the form of MPAKs from the central computer 74 via an associated antenna 72. Likewise, the radio modem can transmit MPAK data to the central computer system 74 using antenna 92.

The radio interface and modulation demodulation circuitry 88 includes standard radio components, such as mixers, downconverters, limiting filters, discrimination circuitry, modulation circuitry, analog to digital and digital to analog converters, etc. This circuitry is used to receive an RF signal from the Mobitex network, reduce the signal to a demodulation frequency, demodulate baseband information from the signal, and then to convert the analog signal into a digital representation. Likewise, this circuitry takes a digital signal from the microprocessor converts the signal to an analog representation, modulates the baseband information with a carrier signal and upconverts to a RF signal for transmission.

Microprocessor 80 is preferably an Intel 80C188 microprocessor, but could alternatively be any other type of microprocessor or microcontroller. As described above, the microprocessor builds data MPAKs for transmission via radio 88 over the Mobitex network, and receives MPAKs from the radio interface 88 and can take action based on this received data. The microprocessor is connected to RAM 82, which is used as in the prior art for program operation and general purpose memory storage, and Flash ROM 86. The Flash ROM 86 is could be a Flash EPROM, EEPROM, PAROM, or any other type of reprogrammable permanent memory device.

Stored within the Flash ROM 86 is the program(s) that control the operation of the radio modem, including the radio modem control code, the standard MASC protocol program and the ART program that forms a part of the present invention. These latter two programs provide for two different modes of operation of the radio modem 60. When operating in the MASC mode, the radio modem operates like other standard Mobitex radio devices, with the serial port 90 being configured to connect to another computer system that communicates to the radio modem 60 using the MASC protocol. The second mode of operation, which will be described in more detail below, is the autonomous radio telemetry or ART mode. ART takes the place of the MASC data-link layer (i.e. can send, receive and interpret the MPAKs), remaps the radio modem serial port 90 to interface to the input/output devices 94, 96, 98 and provides the software state machine architecture for controlling the decisions of the microprocessor 80.

Microprocessor 80 is also connected to serial interface 90, which is preferably an RS-232 interface, but could be any other type of serial, parallel, or other data communication interface. The 14-pin RS-232 standard interface is mapped for the two modes of operation, MASC, and ART, as shown in FIG. 4. As seen in the table next to the pins of the serial port, when the radio modem is operating in MASC mode, the serial port is configured to transmit and receive serial data with another computer system that is using the radio modem simply as a communication element. But, when the radio is switched into ART mode, the ART program causes the microprocessor 80 to remap the serial port so that there are four general purpose TTL inputs, labelled Input 0–Input 3, four outputs, labelled Output 0–Output 3, and an $I^2C$ data bus, with associated clock and data lines.

The architecture of the ART program will be described in more detail below, but as can be appreciated from FIG. 4, by taking advantage of the inherent processing power of the radio modem 60 and by providing the additional intelligence (ART) necessary to convert the radio from a general purpose communications device into a special purpose telemetry computer, an improved telemetry device and system can be constructed which eliminates the need for a separate telemetry computer, and thereby provides a lower cost, lower power, easier to integrate radio telemetry system.

Having described the broad concept of the autonomous radio telemetry system of the present invention, attention is now turned to the decision-making architecture of the improved radio modem operating the ART telemetry program. It is to be understood that the following detailed description of the ART system architecture is but one embodiment of a system design that can be used with the present invention, and that many other designs could alternatively be implemented without departing from the spirit or scope of the invention.

Figure 5:
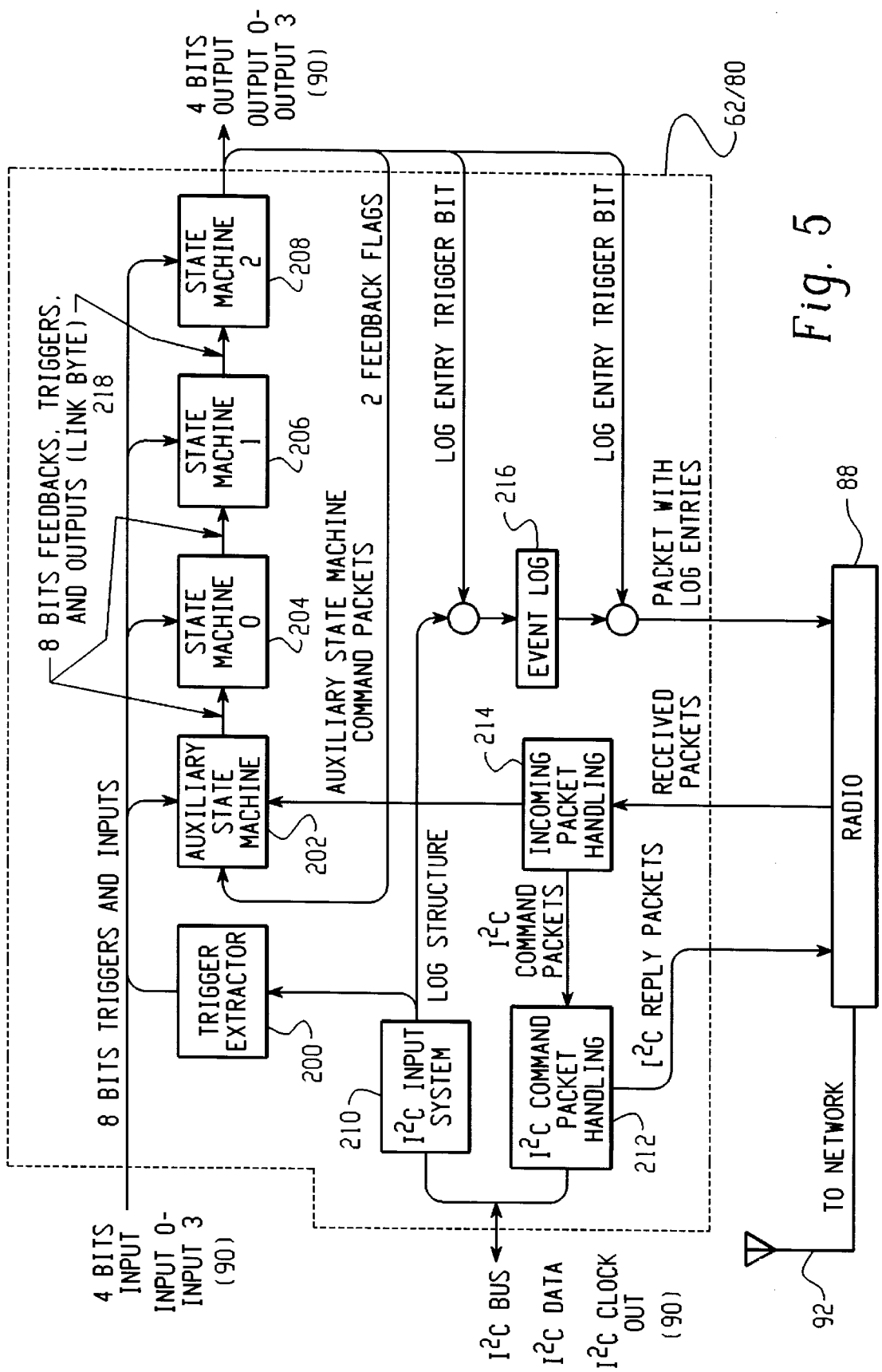
FIG. 5 is a block diagram of the state machine architecture programmed into the radio modem of the present invention.

FIG. 5 sets forth a block diagram of radio modem 60 configured to operate the ART architecture stored in Flash ROM 86. FIG. 5 includes the same elements as FIG. 4, except that the microprocessor 80 and ART program stored in Flash ROM 62 are replaced with the system architecture diagram 200–216. Also, the serial interface 90 is broken into logical pieces: inputs, outputs, and the I$^2$C bus.

The ART architecture includes three programmable state machines 204, 206, 208, that can each traverse through a limited predetermined number of states. These state machines (204, 206, 208) are termed the "intrinsic" state machines, because their state structure, including the number of states they can traverse through, is predetermined. However, as is described in more detail below, these machines are highly configurable, resulting in a very flexible design. ART also includes an auxiliary reconfigurable state machine 202, that is more flexible than the three intrinsic state machines 204–208, the auxiliary state machine being capable of traversing through a much larger number of states than the intrinsic machines.

A state machine is a programmed decision-making engine that, at any given time, is in one of several possible states, and that receives input information in the form of a binary input word, and generates output information in the form of a binary output word. Each state has a specific logical meaning that corresponds to a specific output word, which may, in turn, cause certain programmed actions to take place. To advance from one state to the next, the propagation condition, which is simply a logical test of the input word associated with the state machine, must be met. If the propagation condition is met, then the state machine propagates to the next state, or, if the reset condition is met or detected the state machine may return to the reset state.

The ART system preferably includes three preprogrammed or intrinsic state machines and one auxiliary state machine. The three intrinsic machines are used for simple decision making operations and include three possible decision-making states, and a reset state. The auxiliary state machine is more flexible in that it includes up to 25 states, in the preferred embodiment, and can be separately reconfigured and programmed remotely from the central computer system.

Each state machine receives an input word (defined further below), that is used by the state machine updating algorithm to check whether the machines propagation condition has been met. Each state machine also includes a repetition counter that is used to count the number of times a certain propagation condition has been met. The state machines react to the input word, repetition counter and propagation condition test by generating the output word that causes certain action to take place, such as controlling an output device, generating a log event packet, or causing an MPAK to be transmitted to the central facility.

In addition to the state machines, ART includes an I$^2$C bus subsystem comprising an input system 210, command packet handler 212, and trigger extractor 200. Other elements of the ART architecture include an Event Log 216, where log entries can be stored, indicating that a certain event has been sensed by one of the state machines, a packet handler 214, and a repetition counter (not shown). The operation of these elements is described in more detail below, in connection with FIGS. 5–8.

The decision-making core of the ART architecture are the three state machines 204, 206 and 208. Each of the state machines 204, 206, 208 includes reconfigurable conditions for propagating from one state to the next based on the values of 16 input bits called the "input word". The input word for each state machine is composed of the following bits (msb-lsb): Link Byte 218 (bits 15–8); Trigger Extractor 200 Outputs (bits 7–4); and serial port I/O inputs 90 (bits 3–0). The state machines can be configured to interpret the input word in a variety of ways. Each state of a state machine has a propagation condition that specifies a required bit condition for each of the 16 bits of the input word. If every bit condition is met, then the propagation icondition as a whole is met, and the repetition counter (described below) is incremented if the specified number of repetitions for that propagation condition has not been reached, or the next state is selected. In response to the condition of the input word, the state machines determine which output lines (Output 0–Output 3) are to be set, when an Event Log entry is to be saved, and when accumulated log entries are to be sent as a log MPAK.

The Link Byte 218 is included in the input word for each state machine. The Link Byte allows the state machines to pass signals to each other, to set the states of the output lines 90, and to control the logging of events. The table below shows the format of the Link Byte 218.

| | |
|---|---|
| Bit 7 (msb) | Feedback 0. Used for passing information from one machine to the next. |
| Bit 6 | Feedback 1. Used for passing information from one machine to the next. |
| Bit 5 | Log Entry Trigger. If set after all machines have iterated, a log entry is added. |
| Bit 4 | Log Packet Trigger. If set after all machines have iterated, the entries in the Event Log are put in an MPAK and sent. |
| Bit 3 | Output 0. Value placed on output line 0. |
| Bit 2 | Output 1. Value placed on output line 1. |
| Bit 1 | Output 2. Value placed on output line 2. |
| Bit 0 (lsb) | Output 3. Value placed on output line 3. |

The feedback bits are internal to the ART architecture and retain their values from one iteration to the next. The log bits are used for data acquisition. The log entry trigger causes a log entry to be generated and queued inside the radio modem, and the log packet trigger sends a log packet containing the queued log entries to the central computer system 74. This logging feature allows the radio modem to log several events in memory, and only dispatch the series of events at a later time. The output bits are used to set the physical state of the four output lines on the serial port 90 (Output 0–Output 3).

The remaining 8 bits of the input word include four bits directly corresponding to the level of the four input lines (Input 0–Input 3) and another four bits generated by the Trigger Extractor 200 from the data acquired through the I²C input subsystem (if enabled). The I²C input system 210 can be configured to issue commands on the I²C bus 212 and to read the results into a buffer. The I²C input system is flexible and can be configured to access any I²C compliant peripheral, as is discussed in more detail below in connection with FIG. 8.

Each state machine has a repetition counter to keep track of the number of iterations in which a state's propagation condition has been met since a given state was entered. Whenever all the input bits satisfy the propagation condition, the repetition counter is checked against a repeat parameter for that condition. If the repeat parameter is set to zero, the state condition is required to be met only once. If the repetition parameter is set to 1, the propagation condition must be met an initial time, plus once more on the next iteration before the state machine will advance. The repetition counter can be used to debounce signals, measure lengths of pulses and delays, or count the iterations of another state machine.

In addition to the three intrinsic state machines 204, 206, 208, an auxiliary state machine 202 can be invoked via a command packet sent through the network from the central computer system, the command packet invoking and configuring the propagation conditions of this auxiliary state machine. This feature provides for in-system programmability without having to reprogram the entire device, or without having to send a technician out to the remote location where the radio device is located.

The three state machines 204–208 and the auxiliary state machine 202, if invoked or activated, are checked and updated at regular time intervals, or iterations. Each machine is capable of modifying the special "link" byte 218, which in turn becomes 8 of the 16 bits of input used by subsequent machines. In this manner the state machines can communicate with each other, the state of one machine affecting the state of another machine. Special bits in the link byte allow the state machines to trigger log entries and log packets, and to set the states of the output lines.

Data acquired from the I²C bus, as well as the states of the various state machines 202–208 can be stored in an Event Log 216, whenever the state machines set the log entry trigger bit of the link byte 218. Events are stored in the Event log until a state machine sets the log packet trigger bit. When this occurs, data is transferred from the event log into a MPAK and sent by the radio 88 over the Mobitex network to the central computer system 74. The event log is then cleared of event log data.

Several different types of data packets (MPAKs) can be transmitted to a radio modem configured with the ART system, and these packets are handled by packet handler 214. These types of packets include the ART Configuration Packet for reconfiguring the radio modem, the Auxiliary State Machine Invocation and Configuration Packet for reprogramming the auxiliary state machine, and the I²C Command Packet for providing instructions for a series of I²C Commands to be sent over the I²C bus. The I²C Command Packet causes a one-time series of commands to take place, whereas the ART Configuration and Auxiliary State Machine Packets cause a permanent but reprogrammable change to the configuration of the radio modem and the ART system by overwriting certain sections of Flash EPROM 62.

All communications with a radio modem executing ART is done thorough MPAKs. The first byte of the data field of the MPAK contains a value indicating how the packet is to be interpreted. Depending on the value of this first byte, the remainder of the data field is interpreted as either a command packet from the central computer system to the radio modem, or a reply packet from the radio modem to the central computer.

Command packets can only be interpreted by a radio modem configured as running ART. If an ART command packet is transmitted to a radio modem running MASC and not ART, the packet will be sent out the modem's MASC mapped serial port 90, and will not be recognized as a command packet. In addition, all ART compliant command packets include a 32-bit password number that must be correctly set in order for the radio modem to accept the packet. This provides for a high level of security, operation, and prevention of improper billing by unauthorized transmissions to the ART capable radio modem.

As referred to above, there are three primary types of ART command packets: (i) ART Configuration Command; (ii) Auxiliary State Machine Command; and (iii) I²C Command. The ART Configuration Command packet contains configuration data for all of ART except the auxiliary state machine. This packet includes configuration data for the three intrinsic state machines 204–208, the I²C I/O subsystem 200, 210, 212, as well as global ART parameters such as state machine iteration rate, destination addressing for log packets, automatic packet triggering, log flags, etc.

The Auxiliary State Machine Command packet contains configuration data for the auxiliary state machine 202. When this packet is received by an ART capable radio modem, the auxiliary state machine 202 is reconfigured to the machine configuration contained in the received packet, setting the initial state, repetition count, and configuration of the number of states (up to 25).

The I²C Command packet contains a series of I²C commands. These commands are executed immediately after the packet is received. If the "reply" field of the packet structure is set, any data read back as a result of the I²C commands is placed into a packet and sent back to the central computer system 74 as a reply packet.

Other ART command packet types include: Status Request, Set Powersave Mode, and Log Packet Dispatch enable/disable command. The Status Request packet causes the remote radio modem to report all the variables of ART, including all configuration and status variables. The Set Powersave Mode causes the radio to enter a lower power state in order to save battery power. Finally, the Log Packet Dispatch enable/disable command packet is used to stop a radio modem that, because of its configuration is sending log packets at a far greater rate than anticipated.

ART reply packets include: Log Packets; I²C Response Packets; ART Status; and Unknown Command Error packets. The Log Packet is sent by the radio modem whenever the log entry count reaches an automatic trigger level, or when the Log Packet trigger bit is set after the state machines have iterated through one cycle. The Log Packet contains a header which describes the packet and the number of log entries, plus a variable number of log entries.

The I²C Response Packet is sent to the central computer system if the "reply" field in the I²C Command Packet was set. This packet includes the data read from the I²C bus in the process of executing the commands in the I²C Command Packet.

The ART Status Reply packet is sent to the central computer system in response to an ART Status Request Command packet. The Status Reply packet includes a copy of the structure of all of ART's configuration and status variables. Finally, the Unknown Command reply packet is sent to the central computer system if the first byte in the data field of the command packet was an unrecognized command type.

Each state machine 204–208 has a 16-bit input word as described above, and is checked and updated at regular intervals (termed an "iteration"). On each iteration of the state machines, the input lines are read and any configured $I^2C$ is performed. The resulting information from the input lines and $I^2C$ bus is collated into the lower 8 bits of the input word at the start of each iteration. The high byte of the input word consists of the internal link byte.

The three state machines 204–208 are checked and updated in sequence, with 204 being updated first, then 206 and finally 208. Each state machine can modify the special Link Byte 218 to affect the subsequent state machines. After all the state machines have been updated in an iteration, the final values of some of the bits in the link byte are used to set the output lines and to control the logging of events, as described above in the Table showing the format of the Link Byte 218.

FIG. 6 sets forth a state diagram for one of the state machines 204–208. Each intrinsic state machine 204–208 has a predefined state transition structure including three operating states 102, 104, 106, and a reset state 100. Although the state transitions are restricted, the conditions for propagating from one state to the next are configurable, thus permitting creative solutions for propagating from one state to the next, and through the use of the Link Byte 218, for causing the propagation of one machine to affect the others.

As set forth in FIG. 6, there are three configurable propagation conditions that can be programmed into the ART state machines. Each state machine is defined by a propagation condition for each of its states and a reset condition. Each state's propagation condition determines which bits in the link byte are to be modified while in the state, as well as what conditions are required to pass to the next state.

In condition A, a given state's propagation condition has been met, as well as the specified number of repetitions. If condition A is met, the next state is entered, and the next state propagation condition is immediately checked. In condition B, the state's propagation condition has been met, but the required repetition count has not been satisfied. If this condition is met, the state machine remains in the same state, but the repetition counter is incremented. Finally in condition C, the machines reset condition has been met. If this condition is met, the state machine enters and remains in its reset state until the reset condition is not longer met.

Figure 7:
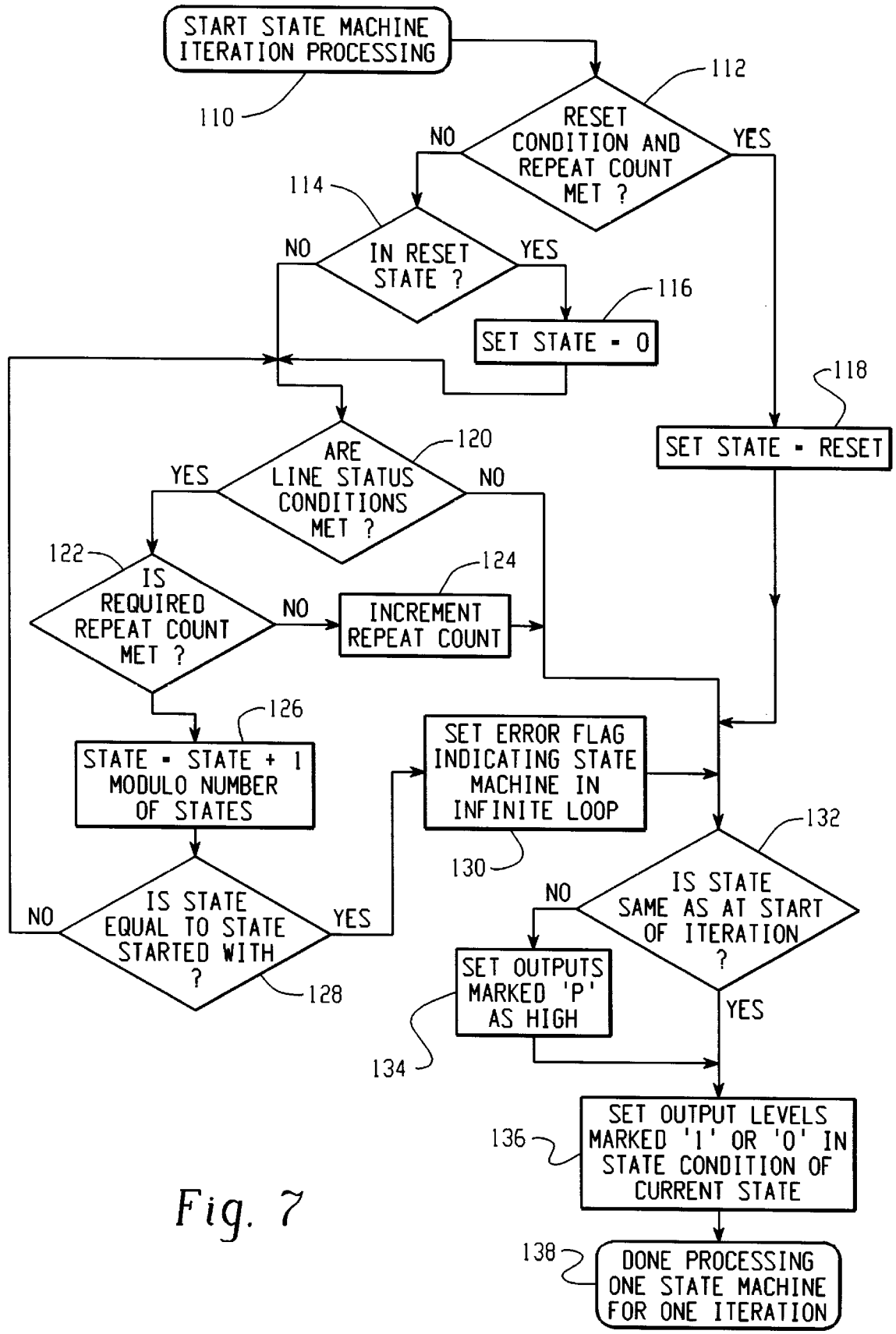
FIG. 7 is a flow chart of the state machine updating algorithm.

FIG. 7 sets forth the state machine updating algorithm for each state machine. Starting at 110, the algorithm checks the reset condition and whether the repetition counter has been met at 112. If either condition is true, then control is passed to 118, the state machine is put into the reset state, and control is passed to block 132.

If the test at 112 is false, the algorithm checks if the machine is currently in the reset state at 114. If so, the state is set to zero, if not, then at 120, the input line status conditions are checked. If the line status conditions are not met, then control is passed to block 132 for further processing. If the line status conditions are met, then at 122 the repetition counter is checked. If the number of programmed repetitions is not met, the repetition counter is incremented at 124, and control is passed to block 132. If, however the number of programmed repetitions is met, then the state of the state machine is incremented to the next state at 126. After progressing to the next state, the algorithm checks, at 128, whether the next state is equal to the prior state, indicating that the state machine may be in an infinite loop. If so, an error flag is set at 130, and control is passed to block 132. If the test at 128 is false, indicating that the machine is not in an infinite loop, then control is passed back to test 120, which then tests whether the current line conditions are met for the next state.

At block 132, the algorithm checks whether the current state is the same as at the start of the present updating iteration. If so, the output levels marked as "1" or "0" are set at 136, and the processing for this state machine for this iteration is complete. If the test at 132 indicates that the state is not the same as at the start of the iteration, then at 134 the outputs marked "P" are set high, and program flow continues to steps 136 and 138. This updating algorithm occurs each iteration for each state machine.

In addition to the four general purpose inputs and outputs supported by the ART-system, the present invention also supports an interface to a serial expansion bus, such as the $I^2C$, or Inter-Integrated Circuit Bus. The $I^2C$ bus is a widely used industrial data bus that can be implemented with only two lines, a clock line and a data line. The $I^2C$ bus uses a synchronous communication protocol that can be used to communicate with any of a wide array of $I^2C$ compliant peripherals, such as A/D converters, D/A converters, programmable I/O boards, LCDs, audio/video devices, etc.

As described above in connection with FIG. 5, the ART $I^2C$ subsystem consists of blocks 200 (Trigger Extractor), 210 ($I^2C$ Input System), 212 ($I^2C$ Command Packet Handling), and 214 (Incoming Packet Handling). In addition to these logical blocks which are used for receiving, transmitting and handling the $I^2C$ data devices, the ART program reconfigures the serial port 90 such that two of the MASC communication lines are configured as the $I^2C$ data and clock lines.

$I^2C$ Command packets received by the radio 88 are routed to the packet handler 214, which determines that the received MPAK is an $I^2C$ Command packet and then routes the packet to the $I^2C$ Command Packet Handler 212, also known as the $I^2C$ Command Interpreter. Commands for the Command Interpreter consist of 16 bit command words. Each command word is either a receive or a send command. The least significant 8 bits of the command word represent the byte to be transmitted across the $I^2C$ bus, for a send command, or the number of bytes to be received from the bus, for a receive command. The $I^2C$ Command Packet Handler 212 also formulates the $I^2C$ Reply Packets, generally formed in the case of a $I^2C$ receive data command, and which are forwarded to radio 88 for transmission over the network.

Figure 8:
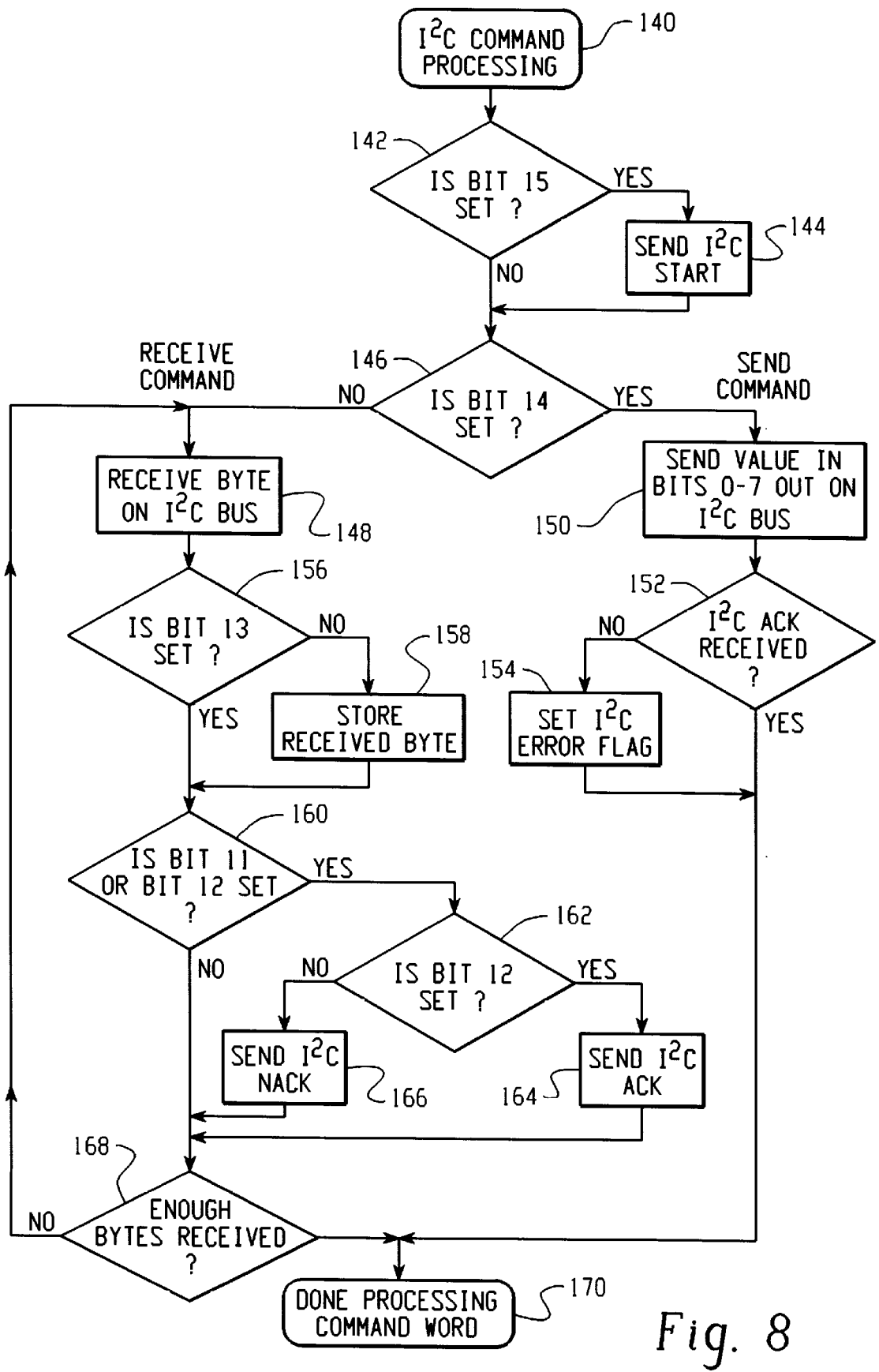
FIG. 8 is a flow chart of the I²C command interpreter algorithm.

FIG. 8 illustrates the program flow for each $I^2C$ command word that is interpreted by the Command Interpreter 212. Up to 16 $I^2C$ Commands can be executed during each iteration of the state machines.

Starting at 140, step 142 tests whether bit 15 of the $I^2C$ command word is set. If so, the $I^2C$ START command is sent on the bus. If bit 15 is not set, and in any case after the START commands is sent at step 144, the Command Interpreter algorithm checks to see if bit 14 of the command word is set at 146.

If bit 14 of the command word is set, than the command is a send command, and at step 150, the send value, which is the lower 8 bits of the command word is sent out on the $I^2C$ bus. Then, at step 152, the $I^2C$ ACK signal is checked on the bus, indicating that the value transmitted was received by the $I^2C$ peripheral. If the ACK signal is received, processing of the command word is complete, and program flow is passed to step 170, waiting for the next I²C Command packet. If the ACK packet was not received at step 152, a system I²C error flag is set, and processing continues to step 170.

If bit 14 of the command word is not set at step 146, then the command is a receive command, and at step 148 the receive byte is read from the I²C bus. Following step 148, step 156 tests whether bit 13 is set. When bit 13 of the command word is set, any received bytes are discarded, rather than stored. If bit 13 is not set, then at step 158, the received byte is stored in a software buffer. Following this operation, step 160 tests whether bits 11 or 12 are set. If either bits 11 or 12 are set, program flow passes to step 162, which tests whether bit 12 is the bit that caused flow to pass from step 160 to 162. If bit 12 is set, then at step 164 the I²C ACK (or acknowledge) command is sent on the bus, otherwise at step 166, the I²C NACK command is sent on the bus. In either case, program flow then passes to step 168, which tests whether more bytes are to be received on the I²C bus. If so, flow control passes back to step 148 and more bytes are received, but if all the bytes have been received then flow passes to 170, indicating that processing of this command word is complete.

Having described in detail the preferred embodiment of the present invention, including its preferred modes of operation, it is to be understood that this operation could be carried out with circuitry or programmed computer instructions different than the circuitry and program flow specifically described. In addition, the particular components and circuit elements making up the radio modem can be readily determined by those of ordinary skill in the art based on the present disclosure. This preferred embodiment is presented only by way of example and is not meant to limit the scope of the present invention which is defined by the following claims.

What is claimed:

1. An improved radio modem for use with a radio telemetry system, the radio modem comprising:

means for transmitting and receiving information over a radio frequency data network;

interface means for directly connecting the radio modem to a plurality of input/output devices;

programmed computer means for communicating information to and from the radio frequency data network via the means for transmitting and receiving and for communicating information to and from the input/output devices via the interface means, and a memory coupled to the programmed computer means for storing a telemetry program, the telemetry program being executed by the programmed computer means in order to interface the radio modem with the input/output devices, wherein the telemetry program includes a plurality of reconfigurable decision state machines that cycle through a series of logical states, wherein the decision state machines are password protected so that a decision state machine can only be reconfigured by an authorized user of the telemetry system.

2. An improved radio modem for use with a radio telemetry system, the radio modem comprising:

means for transmitting and receiving information over a radio frequency data network;

interface means for directly connecting the radio modem to a plurality of input/output devices;

programmed computer means for communicating information to and from the radio frequency data network via the means for transmitting and receiving and for communicating information to and from the input/output devices via the interface means, a memory coupled to the programmed computer means for storing a telemetry program, the telemetry program being executed by the programmed computer means in order to interface the radio modem with the input/output devices, wherein the telemetry program includes a plurality of decision state machines that cycle through a series of logical states, and a link byte connecting each decision state machine to at least one other machine so that each machine can effect the operation of at least one other machine.

3. A dual-mode radio modem capable of operating in a first mode as a general-purpose radio device in conjunction with a host processing system and in a second mode as a special-purpose stand-alone radio telemetry computer, comprising:

an RF transceiver for sending and receiving data;

a serial port; and a microprocessor coupled to the RF transceiver and to the serial port, wherein the microprocessor includes a reprogrammable memory for storing a radio configuration and control program that causes the radio modem to operate in one of two modes, a first mode that configures the radio modem to operate as a general-purpose radio device coupled to the host processing system via the serial port, and a second mode that configures the radio modem to operate as a special-purpose telemetry computer by configuring the serial port to directly interface with a plurality of input/output devices.

4. A radio modem, comprising:

a radio frequency interface circuit including a modulator and a demodulator;

a microprocessor coupled to the radio frequency interface circuit;

a serial interface coupled to the microprocessor, wherein the serial interface is directly connected to a plurality of input/output devices that generate telemetry data and respond to telemetry commands; and a programmable memory coupled to the microprocessor, the re-programmable memory encoded with a telemetry management program for directing the operations of the microprocessor in order to control and communicates with the input/output devices over the serial interface, and to manage communication with the radio frequency interface circuit, wherein the telemetry management program includes a plurality of configurable state machines that control the reception of telemetry data from the input/output devices and the transmission of telemetry commands to the input/output devices.

* * * * *